Figures 1, 2, 3, 4, 5, 6:
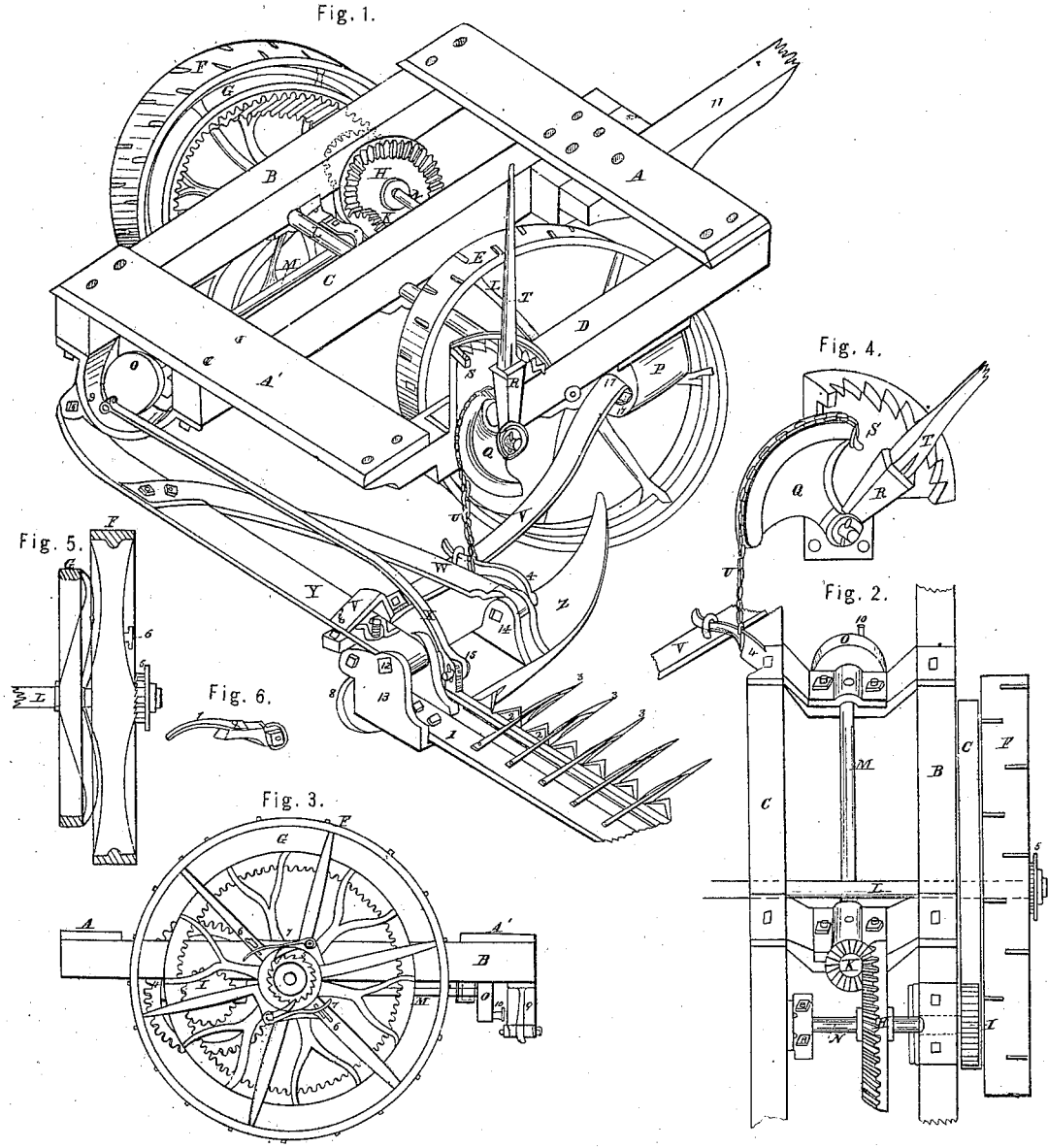

D. Zug.
Mower.

Nº 25697 — Patented Oct. 4, 1859.

Witnesses.
S. G. Musser
J. Stauffer

Inventors.
David Zug

UNITED STATES PATENT OFFICE.

DAVID ZUG, OF SHAEFFERSTOWN, PENNSYLVANIA.

IMPROVEMENT IN HARVESTERS.

Specification forming part of Letters Patent No. 25,697, dated October 4, 1859.

*To all whom it may concern:*

Be it known that I, DAVID ZUG, of Shaefferstown, in the county of Lebanon and State of Pennsylvania, have invented a new and useful Improvement on Combined Reaping and Mowing Machines; and I do hereby declare that the following is a full, clear, and exact description of the construction and operation of the same, reference being had to the accompanying drawings, making a part of this specification, in which—

Figure 1 is an isometrical view of the entire machine, except the seats for the driver and raker, and the ordinary platform, and full extension of the cutting-bar and finger-beam marked 1 2. Fig. 2 shows the bearings and gearings in part. Fig. 3 is a view on the outside of the traction-wheel F and the cogged driving-wheel G and parts visible. Fig. 4 shows the leverage on the side of the truck detached; Fig. 5, the curved arms and spokes on the wheels F G and their adaptation to each other, also the ratchet-hub 5; Fig. 6, one of the clicks, more fully set forth in manner following, the alike parts having the same figure or letter in the several drawings, to which reference is made.

The traction-wheels F F are loose on the axle L, and revolve freely when the click 7 is detached from the lower and moved to the upper notch of the click-catch 6 on the adjoining spoke of the wheel, and, also, when backing the truck, the clicks do not arrest the motion of the wheel; but when down, by a forward motion, the click rests against the ratchet-teeth of the hub, and thus locks the wheel, and consequently gives a rotary motion to the axle L and the driving-wheel G, cogged on its inner periphery, which gives motion to the small cogged wheel I (or pinion I') outside the truck and its shaft N, on which is the bevel-wheel H, geared into the beveled pinion K, which gives motion to the shaft M and its terminal wheel O, to which latter the pitman X is affixed on its outer disk and near its edge on the peg 10, operating the pitman, to which the cutter-bar 2 is affixed at 15 (on the shoe Z) crank fashion, drawing it to and fro in its groove on the shoe and between the fingers 3 3. A semicircular band, 9, with a projecting end, 16, is affixed to the truck-beams B C beneath, on the rear, to which the supporting-bar Y is hinged at 16, and also at 12 to the shoe Z, between the raised bearers 13, for the reception of bar 1, which supports the fingers or guards 3 3 and also the platform. When used for reaping this supporting-beam Y is braced with the piece W, hinged at 14 on the shoe Z. There is also an adjustable caster-wheel, H, (not shown on the model,) under the supporting-bar Y, which rests on the ground at any desired elevation of the cutting-bar adjustment, as in common use. The elastic spring-brace V embraces the supporting-bar Y at *v*, in which the bar can vibrate to adapt it to the folding over of the sickle-bar 2 and finger-supports 1 onto the truck when desired. The other end of the spring-brace V is hinged to a bolt passing through a box, P, with a nut and screw. This bolt is surrounded with thick gum-elastic within the box, being of sufficient power to retain the bolt, yielding only when the guards come in contact with any obstacle while operating, by which much damage to the machine may be prevented, the supporting-bar Y being also so hinged at 16 as to allow a sufficient vibration under such circumstances. A hoisting-bar, 4, is hinged to 14 on the shoe, and secured to the spring-brace V, over which the chain U is passed at one end, while the other end is secured to the projecting point on the quadrant-like grooved lever-arm Q. The lever T in its socket operates in the curved or toothed quadrant S, as shown, by which lever arrangement the shoe Z, with its appendages, can be raised and lowered with ease and retained in the desired notch.

I am aware that various devices have been employed to effect similar objects; but I am not aware of any combination substantially the same.

What I claim as my invention, and desire to secure by Letters Patent, is—

The combination of the brace V with the gum-elastic stuffing-box P and the supporting-bar Y, when these several parts are constructed and arranged in the manner described, for the purpose specified.

DAVID ZUG.

Witnesses:
S. G. MUSSER,
J. STAUFFER.